US007970383B2

(12) United States Patent
Naganuma et al.

(10) Patent No.: US 7,970,383 B2
(45) Date of Patent: Jun. 28, 2011

(54) INFORMATION PROVIDING SYSTEM AND INFORMATION PROVIDING METHOD

(75) Inventors: Takefumi Naganuma, Yokosuka (JP); Shoji Kurakake, Yokohama (JP); Kunihiro Fujii, Yokosuka (JP); Yusuke Fukazawa, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 992 days.

(21) Appl. No.: 11/528,384

(22) Filed: Sep. 28, 2006

(65) Prior Publication Data

US 2007/0073665 A1 Mar. 29, 2007

(30) Foreign Application Priority Data

Sep. 29, 2005 (JP) ................................ P2005-284801

(51) Int. Cl.
*H04M 1/726* (2006.01)
*H04L 12/58* (2006.01)
(52) U.S. Cl. .................. 455/412.1; 455/456.3; 455/457; 707/5; 707/7; 707/9; 707/10; 707/104
(58) Field of Classification Search .................. 707/3, 5, 707/7, 9, 104; 455/456.1–456.3, 457
See application file for complete search history.

(56) References Cited

U.S. PATENT DOCUMENTS

| 5,790,974 | A | * | 8/1998 | Tognazzini | 455/456.5 |
|---|---|---|---|---|---|
| 5,819,261 | A | * | 10/1998 | Takahashi et al. | 707/3 |
| 6,349,257 | B1 | * | 2/2002 | Liu et al. | 701/200 |
| 6,405,034 | B1 | * | 6/2002 | Tijerino | 455/414.3 |
| 6,574,605 | B1 | * | 6/2003 | Sanders et al. | 705/8 |
| 6,732,080 | B1 | * | 5/2004 | Blants | 705/9 |
| 6,745,180 | B2 | * | 6/2004 | Yamanoue | 707/3 |

(Continued)

FOREIGN PATENT DOCUMENTS

CN 1375979 A 10/2002

(Continued)

OTHER PUBLICATIONS

Yusuke Fukazawa, et al., "A Framework for Task Retrieval in Task-Oriented Service Navigation System," OTM Workshops 2005, LNCS 3762, pp. 876-885, 2005.

(Continued)

*Primary Examiner* — Kamran Afshar
*Assistant Examiner* — Khalid Shaheed
(74) *Attorney, Agent, or Firm* — Oblon, Spivak, McClelland, Maier & Neustadt, L.L.P.

(57) ABSTRACT

Providing an information providing system and an information providing method capable of providing detail information required for a user to execute his/her scheduled activity smoothly.
An information providing system 1 comprises an inhibition storing section 101 for preliminary storing inhibition information relating to inhibition factors corresponding to scheduled information relating to the scheduled activity; a candidate storing section 102 for preliminary storing candidate information relating to candidates of a coping method corresponding to the inhibition information; a schedule receiving section 103 for receiving the scheduled information from a communication terminal; an inhibition selecting section 104 for selecting from the inhibition storing section the inhibition information corresponding to the scheduled information; a candidate selecting section 105 for selecting from the candidate storing section the candidate information corresponding to the inhibition information; a candidate transmitting section 106 for transmitting the candidate information to the communication terminal 2; a selection receiving section 107 for receiving from the communication terminal 2, a selection information selected by the communication terminal 2; and a detail transmitting section 108 for transmitting detail information on the basis of the selection information to the communication terminal 2.

6 Claims, 12 Drawing Sheets

U.S. PATENT DOCUMENTS

| | | |
|---|---|---|
| 7,336,964 B2 * | 2/2008 | Casey .................... 455/456.3 |
| 7,340,245 B2 * | 3/2008 | Kikuta et al. ............. 455/414.2 |
| 2002/0052674 A1 * | 5/2002 | Chang et al. ................ 700/300 |
| 2002/0132627 A1 | 9/2002 | Ichihara |
| 2002/0184200 A1 * | 12/2002 | Ueda et al. .................... 707/3 |
| 2002/0188676 A1 * | 12/2002 | Iai et al. ...................... 709/203 |
| 2003/0093706 A1 * | 5/2003 | Cronin ........................... 714/1 |
| 2004/0128066 A1 | 7/2004 | Kudo et al. |
| 2005/0144162 A1 * | 6/2005 | Liang ............................. 707/3 |

FOREIGN PATENT DOCUMENTS

| | | |
|---|---|---|
| CN | 1539075 A | 10/2004 |
| JP | 2002-123541 | 4/2002 |
| JP | 2002-279028 | 9/2002 |
| JP | 2003-246270 | 9/2003 |
| JP | 2003-319428 | 11/2003 |
| JP | 2004-28691 | 1/2004 |
| JP | 2004-96621 | 3/2004 |
| JP | 2004-98997 | 4/2004 |
| JP | 2004-314725 | 11/2004 |
| JP | 2005-191945 | 7/2005 |
| KR | 10-1998-702868 | 8/1998 |
| KR | 10-2005-0010857 | 1/2005 |
| TW | 200304609 | 10/2003 |
| TW | 200503520 | 1/2005 |
| TW | 200509001 | 3/2005 |
| TW | 1246346 | 12/2005 |
| WO | WO 96/27835 | 9/1996 |
| WO | WO 03/102736 | 12/2003 |

OTHER PUBLICATIONS

Takefumi Naganuma, et al., "Task Knowledge Based Retrieval for Service Relevant to Mobile User's Activity," ISWC 2005, LNCS 3729, pp. 959-973, 2005.

Munehiko Sasajima, et al., "Toward Task Ontology-based Modeling for Mobile Phone Users' Activity" 2 pages.

Taiwanese Office Action issued Oct. 26, 2010, with English translation.

* cited by examiner

Fig.2

| SCHEDULED TASK ID | SCHEDULED TASK NAME | PARENT TASK ID | EXECUTION SEQUENCE NUMBER |
|---|---|---|---|
| 1001 | TO GO TO A THEME PARK TO PLAY | 0 | 0 |
| 1002 | TO MOVE TO A THEME PARK BY MY CAR | 1001 | 1 |
| 1003 | TO ENTER A THEME PARK | 1001 | 2 |
| 1004 | TO EXPERIENCE AN ATTRACTION | 1001 | 3 |
| 1005 | TO MOVE TO A THEME PARK BY TRAIN | 1001 | 0 |
| 1006 | TO MOVE TO A PLATFORM OF TRAIN | 1005 | 1 |
| 1007 | TO GET ON A TRAIN | 1005 | 2 |
| 1008 | TO MOVE TO A THEME PARK FROM A PLATFORM | 1005 | 3 |
| ... | ... | ... | ... |

Fig.3

| INHIBITION FACTOR ID | INHIBITION FACTOR NAME | SCHEDULED TASK ID |
|---|---|---|
| 001 | CANNOT MOVE DUE TO A BAD WHETHER | 1006 |
| 002 | TRAFFICS DO NOT MOVE | 1007 |
| 003 | CANNOT USE TRANSPORTATION FACILITIES | 1007 |
| 004 | CANNOT MOVE ON A MOTOR ROAD DUE TO A TRAFFIC JAM | 1002 |
| ... | ... | ... |

Fig.4

| INHIBITION FACTOR ID | CANDIDATE INFORMATION ID | HANDLING / PREVENTION IDENTIFICATION FLAG |
|---|---|---|
| 001 | 2004 | 0 |
| 001 | 2005 | 1 |
| 002 | 2006 | 0 |
| 004 | 2007 | 1 |
| ... | ... | ... |

Fig.5

| SCHEDULED TASK ID | IDENTIFICATION ID | EVENT ACCURACY |
|---|---|---|
| 1001 | LOCATION (STATION) | 0 |
| 1001 | LOG (ENTERING A TICKET GATE) | 1 |
| 1007 | LOG (ENTERING A TICKET GATE) | 1 |
| ... | ... | ... |

Fig.6

| SERVICE NAME | URI INFORMATION | SCHEDULED TASK ID |
|---|---|---|
| ONLINE TICKET | http://*******.co.jp/sample1.html | 1004 |
| COMPARISON WITH A DISCOUNT TICKET | http://*******.co.jp/sample2.html | 1004 |
| OPERATION CONDITION OF THE ENTIRE JR LINE | http://*******.co.jp/sample3.html | 1007 |
| OPERATION CONDITION OF THE ENTIRE KEIHIN KYUKO LINE | http://*******.co.jp/sample4.html | 1005 |
| OPERATION CONDITION OF THE ENTIRE METRO LINE | http://*******.co.jp/sample5.html | 1004 |
| OPERATION CONDITION OF THE ENTIRE TOKYO METROPOLITAN LINE | http://*******.co.jp/sample6.html | 1006 |
| ... | ... | ... |

INFORMATION PROVIDING SYSTEM AND INFORMATION PROVIDING METHOD

BACKGROUND OF THE INVENTION

1. Field of the Invention

The present invention relates to an information providing system and an information providing method capable of searching information required for a user to execute his/her scheduled activity to provide it to the user.

2. Related Background Art

Accessing information of the Internet using mobile communication terminals such as cellular phones is generally prevailing. However, as information of the Internet increases, it becomes more difficult for users of mobile communication terminals to obtain appropriately selected desired information. For example, when users of mobile communication terminals are going to execute their scheduled activities smoothly, they desire to obtain detail information required for this.

For example, users may utilize a directory type of search engine intended for mobile communication terminals in order to obtain their desired information. The directory type of search engine refers to a service for searching information relating to a plurality of links of web-sites of the Internet, which is classified into each category. As one example thereof, the directory type of search engine intended for mobile communication terminals operated by Rakuten Inc., etc. is listed.

However, if users input into the directory type search engine intended for mobile communication terminals without designating appropriate search keywords, there may be a case that they require a large amount of work to reach the desired information. Further, since input/output functions and operationality provided for mobile communication terminals are limited compared to those of personal computers, etc., it is difficult for users to obtain their desired information by searching with little operation.

Here, there exists, for example, a problem-solving database search system, for example, disclosed in the following patent document 1 as a system supporting information searches of users who are not able to designate appropriate search keywords. This system, firstly searches which word in the dictionary database is matched by a word input by a user, and indicates a navigation sentence linked to the searched word hierarchically. Then, this system provides information on the basis of the navigation sentence selected by the user.

In addition, as a system delivering a regional information matching users' activities, for example, an information providing system intended for mobile terminals disclosed in the following patent document 2 is listed. This system retrieves from regional information registered in an information management database, matching regional information adapted to spatial location information, desired conditions for spatial range, and desired conditions for contents received from users' mobile communication terminals to deliver the matching regional information to the mobile communication terminals.

In this information providing system intended for mobile terminals, when retrieving the matching regional information from the regional information registered in the information management database, it is expected that the regional information more adapted to the users' activities is retrieved and provided to the users by searching with a searching method disclosed in the following patent document 1.

[Patent Document 1] Japanese Patent Application Laid-open No. 2002-123541

[Patent Document 2] Japanese Patent Application Laid-open No. 2003-319428

However, in the case that a search keyword designated by a user matches a plurality of words in a dictionary database, a lot of operation to select an appropriate navigation sentence among two or more ones, is required. Consequently, there exists a problem that it is difficult to obtain detail information required for executing scheduled activity smoothly.

SUMMARY OF THE INVENTION

Accordingly, the present invention aims at providing an information providing system and an information providing method capable of easily providing detail information required for a user to executes his/her scheduled activity smoothly.

An information providing system according to the present invention is one for searching information required for a user to execute a scheduled activity planned by the user to provide it to the user, comprises: an inhibition storing means for preliminary storing inhibition information relating to inhibition factors corresponding to scheduled information relating to the scheduled activity; a candidate storing means for preliminary storing candidate information relating to candidates of a coping method corresponding to the inhibition information stored in the inhibition storing means; a schedule receiving means for receiving the scheduled information from a communication terminal of the user; an inhibition selecting means for selecting from the inhibition storing means the inhibition information corresponding to the schedule information received by the schedule receiving means; a candidate selecting means for selecting from the candidate storing means the candidate information corresponding to the inhibition information selected by the inhibition selecting means; a candidate transmitting means for transmitting the candidate information selected by the candidate selecting means to the communication terminal; a selection receiving means for receiving from the communication terminal selection information selected from among the candidate information by the communication terminal which received the candidate information from the candidate transmitting means; and a detail transmitting means for transmitting detail information on the basis of the selection information received by the selection receiving means to the communication terminal.

According to the information providing system of the present invention, the inhibition information corresponding to the schedule information received by the schedule receiving means is selected from the inhibition storing means by the inhibition selecting means. Next, the candidate information corresponding to the inhibition information is selected from the candidate storing means by the candidate selecting means, and the candidate information is transmitted to the communication terminal by the candidate transmitting means. Further, the selection information is selected from among the candidate information by the communication terminal which received the candidate information, and the selection information is received by the selection receiving means from the communication terminal. Then, the detail information on the basis of the selection information is transmitted to the communication terminal by the detail transmitting means. Accordingly, the inhibition information corresponding to the scheduled information relating to the scheduled activity planned by the user of the communication terminal is selected by the detail transmitting means. As for this inhibition information, the selection information is selected from among the candidate information, and the detail information on the basis of the selection information is transmitted to the communication terminal. As a result, the information providing system is capable of providing easily the detail information required for the user of the communication terminal to execute his/her scheduled activity smoothly.

It is also preferable that the schedule receiving means receive from the communication terminal phase information indicating whether the scheduled activity is at a planning phase or at an execution phase, and the inhibition selecting means select the inhibition information from the inhibition storing means on the basis of the phase information received by the schedule receiving means.

Accordingly, the inhibition information is selected by the inhibition selection means on the basis whether the scheduled activity is at the planning phase or at the execution phase, and thereby it is made possible that the information providing system provides the user of the communication terminal with more appropriate detail information according to the situation of the phase of the scheduled activity.

Further, it is also preferable that the information providing system comprise a location obtaining means for obtaining location information of the communication terminal, and the inhibition selecting means select the inhibition information from the inhibition storing means on the basis of the location information obtained by the location obtaining means.

Accordingly, the inhibition information is selected by the inhibition selection means on the basis of the location information of the communication terminal, and thereby the information providing system is capable of providing the user of the communication terminal with more appropriate detail information according to the location of the communication terminal.

Further, it is also preferable that the information providing system comprise a history obtaining means for obtaining history information relating to a communication of the communication terminal, and the inhibition selecting means select the inhibition information from the inhibition storing means on the basis of the history information obtained by the history obtaining means.

Accordingly, the inhibition information is selected by the inhibition selecting means on the basis of the history information relating to the communication at the communication terminal, and thereby the information providing system is capable of providing the user of the communication terminal with more appropriate detail information according to the history information of the communication terminal.

Further, it is also preferable that the information providing system comprise a schedule predicting means for predicting the scheduled activity as a predicted activity on the basis of the history information obtained by the history obtaining means, and the inhibition selecting means select the inhibition information from the inhibition storing means on the basis of the predicted activity predicted by the schedule predicting means.

Accordingly, the inhibition information is selected by the inhibition selecting means on the basis of the predicted activity predicted by the schedule predicting means, and thereby the information providing system is capable of providing the user of the communication terminal with more appropriate detail information according to the predicted activity as to the communication terminal.

An information providing method according to the present invention is one for searching information required for a user to execute a scheduled activity planned by the user to provide it to the user, and comprises: a schedule receiving step of receiving schedule information relating to the scheduled activity from a communication terminal of the user; an inhibition selecting step of selecting from an inhibition storing means preliminary storing inhibition information, the inhibition information relating to inhibition factors corresponding to the schedule information received in the schedule receiving step; a candidate selecting step of selecting from a candidate storing means preliminary storing candidate information, the candidate information relating to candidates of a coping method corresponding to the inhibition information selected in the inhibition selecting step; a candidate transmitting step of transmitting the candidate information selected in the candidate selecting step to the communication terminal; a selection receiving step of receiving from the communication terminal, the selection information selected from among the candidate information by the communication terminal which received the candidate information in the candidate transmitting step; and a detail transmitting step of transmitting detail information on the basis of the selection information received in the selection receiving step to the communication terminal.

According to the information providing method of the present invention, firstly, the inhibition information corresponding to the schedule information received in the schedule receiving step is selected from the inhibition storing means in the inhibition selection step. Next, the candidate information corresponding to the inhibition information is selected from the candidate storing means in the candidate selecting step, and the candidate information is transmitted to the communication terminal in the candidate transmission step. Further, the selection information is selected from among the candidate information by the communication terminal which received the candidate information in the candidate transmitting step, and the selection information is received from the communication terminal in the selection receiving step. Then, the detail information based on the selection information is transmitted to the communication terminal in the detail transmitting step. Accordingly, the inhibition information corresponding to the scheduled information relating to the scheduled actions planned by the user of the communication terminal is selected. With respect to this inhibition information, the selection information is selected from among the candidate information, and the detail information based on the selection information is transmitted to the communication terminal. As a result, the information providing system is capable of providing easily the detail information required for the user of the communication terminal to execute the scheduled activity planned by the user smoothly.

According to the present invention, it is made possible to provide easily detail information required for a user to execute his/her scheduled activity smoothly.

BRIEF DESCRIPTION OF THE DRAWINGS

FIG. 2 is a structure drawing explaining a table structure included in a database constituting a scheduled task information storing section.

FIG. 3 is a structure drawing explaining a table structure included in a database constituting an inhibition storing section.

FIG. 4 is a structure drawing explaining a table structure included in a database constituting a candidate storing section.

FIG. 5 is a structure drawing explaining a table structure included in a database constituting a history information storing section.

FIG. 6 is a structure drawing explaining a table structure included in a database constituting a detail information storing section.

DESCRIPTION OF THE PREFERRED EMBODIMENTS

Figure 1:
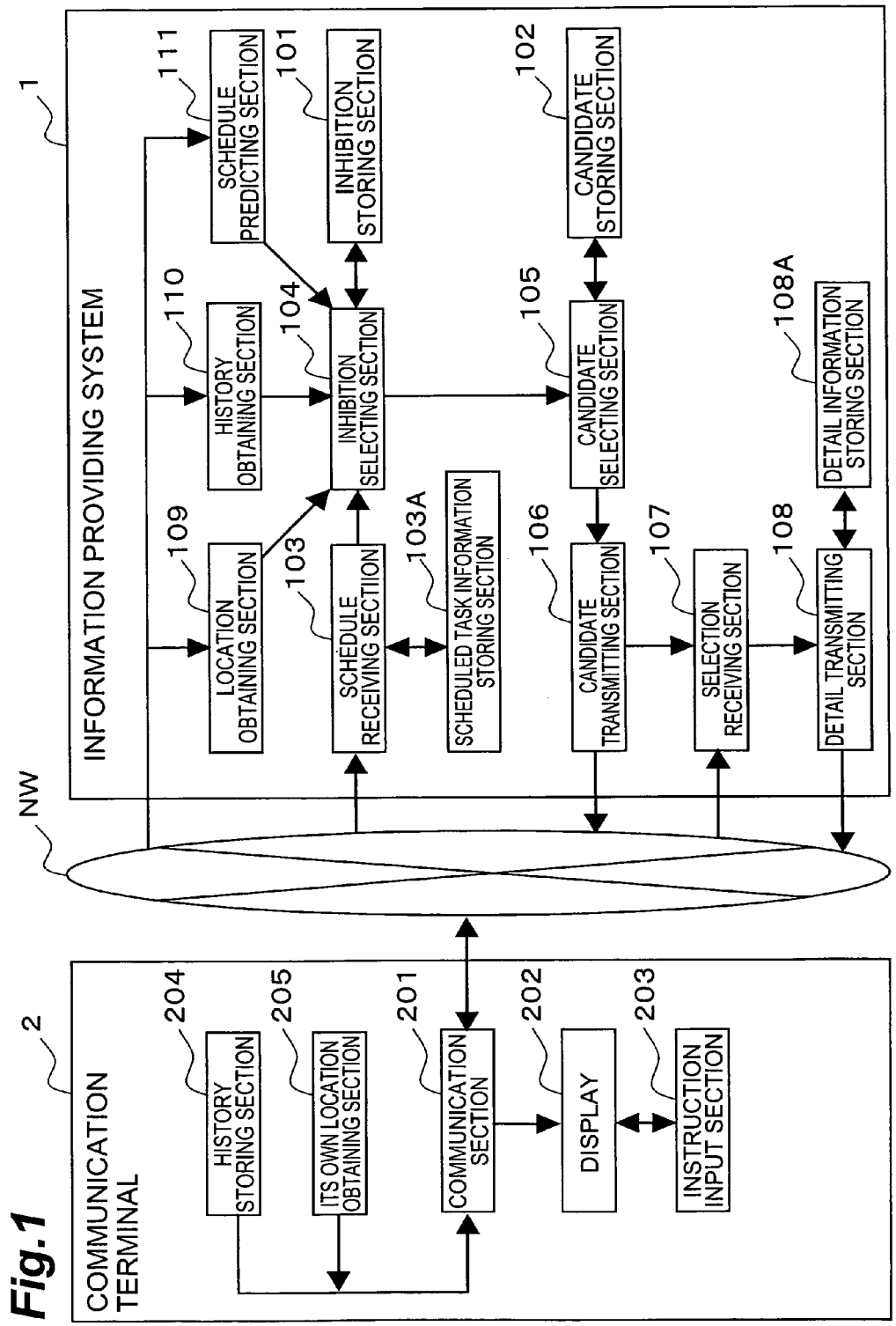
FIG. 1 is a configuration drawing explaining a configuration of an information providing system of the present embodiment.

The preferred embodiment of the present invention will be explained below with reference to the accompanying drawings. In the description of drawing, the same reference numeral will be allocated to the same element, and the overlapping explanation will be omitted. The information providing system of the embodiment according to the present invention will be described referring to FIG. 1. FIG. 1 is a diagram explaining the configuration of an information providing system 1 and a communication terminal 2. In addition, a communication network NW intervenes therebetween. Here, the communication terminal 2 is a terminal capable of communicating with the information providing system 1 via the communication network NW, such as a cell-phone unit that is in widespread use.

The information providing system 1 is a system searching information required for a user of the communication terminal 2 to execute his/her scheduled activity to provide the user with the information. The information providing system 1 is provided with as functional components, an inhibition storing section 101 (inhibition storing means), a candidate storing section 102 (candidate storing means), a schedule receiving section 103 (schedule receiving means), a scheduled task information storing section 103A, an inhibition selecting section 104 (inhibition selection means), a candidate selecting section 105 (candidate selection means), a candidate transmitting section 106 (candidate transmitting means), selection receiving section 107 (selection receiving means), a detail transmitting section 108 (detail transmitting means), detail information storing section 108A, a location obtaining section 109 (location obtaining means), a history obtaining section 110 (history obtaining means), and a schedule predicting section 111 (schedule predicting means). However, each of these functional components may be distributed physically to make up an information providing system 1 as a collective of these components.

Continuously, each component of the information providing system 1 will be explained. An inhibition storing section 101 is a section preliminary storing inhibition information relating to inhibition factors corresponding to scheduled information. The scheduled information here refers to information relating to the scheduled activity planned by the user. As an example of the scheduled information, "going to a theme park by one's car", or the like is listed. Further, the inhibition information refers to information relating to a factor which inhibits an execution of the scheduled activity. As one example thereof, "cannot move on a motor road due to a traffic jam", etc. is listed. The inhibition storing section 101 is constituted with, for example, a database capable of storing the inhibition information, etc. The particulars of a table structure included in the database will be described later.

The candidate storing section 102 is a section preliminary storing candidate information relating to candidates of a coping method corresponding to the inhibition information stored in the inhibition storing section 101. That is, the candidate information relating to candidates of a coping method, for example, one or more candidate information is stored in the candidate storing section 102. As an example of the candidate information, "to know traffic information", etc. is listed. The candidate storing section 102 is constituted with, for example, a database capable of storing the candidate information, etc. The particulars of a table structure included in the database will be described later.

The schedule receiving section 103 is a section receiving from the communication terminal 2 of a user, schedule information and a terminal ID unique to the communication terminal 2. The user inputs the scheduled information (such as "moving to a theme park by my car") into the communication terminal 2 and transmits the scheduled information to the information providing system 1, using a communication function of the communication terminal 2. The schedule receiving section 103 receives the scheduled information transmitted from the communication terminal 2 via the communication network NW. The scheduled information received from the schedule receiving section 103 is handled as a query string. Here, "a query string" refers to a string expressing user's activity schedule. The schedule receiving section 103 selects from the scheduled task information storing section 103A, scheduled task information matching a query string expressing the schedule information. In addition, in the case that there exists no scheduled task information matching the query string expressing the schedule information, the schedule receiving section 103 notifies an error to the communication terminal 2. The particulars of the scheduled task information storing section 103A will be described later.

The schedule receiving section 103 receives phase information from the user's communication terminal 2. Here, the phase information refers to information indicating that the scheduled activity is whether at the planning phase or at the execution phase. The user inputs the phase information into the communication terminal 2 and transmits the phase information to the information providing system 1 by means of the communication function of the communication terminal 2. The schedule receiving section 103 receives the phase information transmitted from the communication terminal 2 via the communication network NW.

The inhibition selecting section 104 is a section selecting from the inhibition storing section 101, the inhibition information (such as "cannot move on a motor road due to a traffic jam") corresponding to the scheduled information received from the schedule receiving section 103. That is, the inhibition selecting section 104 selects the inhibition information matching the scheduled task information. Additionally, it is preferable that a selection by the inhibition selecting section 104 is made on the basis of the phase information received from the schedule receiving section 103, the location information obtained by the location obtaining section 109 described later, the history information obtained by the history obtaining section 110 described later, the predicted activity predicted by the schedule predicting section 111 described later, and the aforementioned ID, etc. Thus, the inhibition information is selected on the basis of the other information, and thereby it is made possible to narrow down the inhibition information matching the scheduled task information to select it. Consequently, providing the user of the communication terminal 2 with the more appropriate detail information is made possible as described later. In addition, the inhibition selecting section 104 selects, for example, one or more of the inhibition information corresponding to the schedule information. Here, in the case that there exists no inhibition information, the inhibition selecting section 104 notifies an error to the communication terminal 2.

The candidate selecting section 105 is a section selecting from the candidate storing section 102, the candidate information (such as "to know railroad traffic information") corresponding to the inhibition information selected by the inhibition selecting section 104. That is, the candidate information is information indicating the candidates of method of coping with the inhibition factor. The candidate selecting section 105 selects, for example, one or more of the candidate information corresponding to the inhibition information and being associated therewith. Here, in the case that there exists no candidate information, the candidate selecting section 105 notifies an error to the communication terminal 2.

The candidate transmitting section 106 is a section transmitting the candidate information selected by the candidate selecting section 105 to the communication terminal 2. In addition, the candidate transmitting section 106 may also transmit to the communication terminal 2, information relating to the predicted activity predicted by the schedule predicting section 111 described later. The candidate transmitting section 106 transmits the candidate information (and information relating to the predicted activity) via the communication network NW. The communication terminal 2 which received the candidate information from the candidate transmitting section 106, selects the method of coping with the inhibition factors as the selection information, among the candidate information.

The selection receiving section 107 is a section receiving from the communication terminal 2, the selection information selected by the communication terminal 2. The selection receiving section 107 receives the selection information via the communication network NW.

The detail transmitting section 108 is a section transmitting to the communication terminal 2, the detail information (such as "subway traffic condition") on the basis of the selection information received by the selection receiving section 107. The detail transmitting section 108 selects from the detail information storing section 108A, the detail information on the basis of the selection information, and transmits the detail information via the communication network NW. The particulars of the detail information storing section 108A will be described later. The communication terminal 2 receives the detail information from the detail transmitting section 108, whereby the user of the communication terminal 2 may obtain the detail information required to execute the scheduled activity smoothly.

The location obtaining section 109 is a section obtaining the location information of the communication terminal 2. For example, the location obtaining section 109 may obtain the location information of the communication terminal 2 by receiving from the communication terminal 2, the location information obtained by the communication terminal 2. For example, as a system obtaining the global location information of its own terminal (its own location obtaining section) provided for the communication terminal 2, GPS (Global Positioning System) is listed. The GPS has a function of obtaining the location information with respect to its own global location via radio waves received from the GPS satellite. As to the form of the location information of the communication terminal 2, its longitude or latitude may be used to display, or famous places (e.g., in front of the Yokohama station), famous facilities (e.g., the Tokyo tower) may be used to display. In addition, the communication terminal 2 may regularly transmit the obtained location information to the information providing system 1, or may transmit it when the contents of the location information change to a large degree.

The history obtaining section 110 is a section obtaining the history information relating to the transmission made at the communication terminal 2. For example, the history obtaining section 110 may obtain the history information of the communication terminal 2 by receiving the history information obtained by the communication terminal 2. The history information includes, for example, information relating to a usage history of Near Field Communication, using the communication terminal 2. Near Field Communication is made for example, by utilizing a contactless IC card function included in the communication terminal 2, when the communication terminal 2 of a user going through a ticket gate to enter a station yard is getting closer to a ticket gate machine installed at the ticket gate. At this time, it is registered in the history information as an identification ID that the Near Field Communication has been made when an event of entering to the ticket gate occurred. The identification ID is, for example, "Log (entering a ticket gate)" in the case that an event of entering a ticket gate occurs and "Log (purchasing goods) in the case that an event of purchasing goods with electronic money occurs. The history information obtained by history obtaining section 110 is stored in the history information storing section described later.

The schedule predicting section 111 is a section predicting the scheduled activity as the predicted activity on the basis of the history information obtained by the history obtaining section 110. The schedule predicting section 111 predicts on the basis of the history information, enabling to predict the scheduled activity of the user of the communication terminal 2 with high hitting ratio. For example, the schedule predicting section 111 predicts that the user will get on the train within a few minutes from the occurrence of the event of entering the ticket gate described above as the predicted activity.

Continuously, the scheduled task information storing section 103A will be explained referring to FIG. 2. FIG. 2 is a structure drawing explaining a structure of a table included in a database constituting a scheduled task information storing section 103A. In the scheduled task information storing section 103A, a scheduled task name, a scheduled task ID, a parent task ID and an execution sequence number are stored being associated with each other. The scheduled task name refers to a name expressing in a string the contents of the scheduled task information (i.e., information relating to tasks which a user may possibly plan to do), and the scheduled task ID refers to an ID identifying each scheduled task information uniquely. Further, the parent task ID is an ID for identifying each group formed by classifying the scheduled task information, and it is predicted that the relevant task is performed after the task corresponding to the scheduled task ID indicated by the parent task ID being performed. The execution sequence number refers to a number indicating a predicted order of scheduled tasks being executed within the scheduled task information classified into the same group.

For example, the scheduled task information, the scheduled task ID of which is "1002", a name of which is "to move to a theme park by one's car" has the parent task ID of "1001", and the execution sequence number thereof is "1". Similarly, the scheduled task information, the scheduled task ID of which is "1003", a name of which is "to enter a theme park", has the parent task ID is "1001", and the execution sequence number is "2". It is predicted that these two scheduled task information have the same parent task ID of "1001" and the execution sequence numbers are serial. Accordingly, it is predicted that the action "to move to a theme park by one's car", and its subsequent action of "to enter a theme park" are performed after the action of determining "to go to a theme park to play" indicated by the scheduled task ID "1001". The aforementioned schedule receiving section 103 selects from the scheduled task information storing section 103A, the scheduled task information having the scheduled task name which matches the query string indicating the schedule information.

Continuously, the inhibition storing section 101 will be explained referring to FIG. 3. FIG. 3 is a structure drawing explaining a structure of a table included in a database constituting the inhibition storing section 101. In the inhibition storing section 101, a name of the inhibition factor, an inhibition factor ID, and a scheduled task ID are stored being associated with each other. A name of the inhibition factor is a name expressing the contents of the inhibition information (i.e., information relating to the inhibition factor corresponding to the schedule information) in a string, and the inhibition factor ID is an ID identifying each inhibition information uniquely. In addition, the scheduled task ID will be already described above, so the explanation of which is omitted here.

For example, the inhibition information, the inhibition factor ID of which is "004", and a name of the inhibition factor of which is "cannot move on a motor road due to a traffic jam", have the scheduled task ID of "1002". Here, as described above, the scheduled task information, the scheduled task ID of which is "1002" has the scheduled task name of "to move to a theme park by one's car". Thus, the inhibition information of "cannot move on a motor road due to a traffic jam" is associated with the scheduled task information "to move to a theme park by one's own car". The inhibition selecting section 104 selects from the inhibition storing section 101, the inhibition information corresponding to the scheduled task ID of the scheduled task information selected by the schedule receiving section 103.

Continuously, the candidate storing section 102 will be explained referring to FIG. 4. FIG. 4 is a structure drawing explaining a structure of a table included in a database constituting the candidate storing section 102. The candidate storing section 102 stores the inhibition factor ID, the candidate information ID, and a handling/prevention identification flag being associated with each other. The candidate information ID is an ID identifying each candidate information uniquely, and the handling/prevention identification flag is a flag identifying whether each candidate information is for coping with the previously occurred inhibition factor or for taking preventative measures from the inhibition factor which is anticipated to occur. In case of being information for coping with the inhibition factor, a flag value is "0", while in the case of being information for preventing from the inhibition factor, a flag value is "1". In addition, the inhibition factor ID as described above will not be explained here.

For example, the candidate information, the ID of which is "2007" corresponds to the inhibition information, the inhibition factor ID of which is "004". The candidate information is information indicating candidates of a method of coping with the inhibition factor indicated by the inhibition information. The aforementioned candidate selecting section 105 selects from the candidate storing section 102, the candidate information ID having the candidate information ID corresponding to the inhibition factor ID of the inhibition information selected by the inhibition selecting section 104.

Continuously, the history information storing section will be explained referring to FIG. 5. FIG. 5 is a structure drawing explaining a structure of a table included in a database constituting the history information storing section. The history information storing section stores the scheduled task ID, the identification ID, and an event accuracy being associated with each other. The event accuracy denotes an index indicating a degree of possibility of the scheduled task identified by the aforementioned scheduled task ID being performed by the user of the communication terminal 2. "0" denotes a low possibility, while "1" denotes a high possibility. In addition, the scheduled task ID and the identification ID described above will not be explained here.

For example, as to the scheduled task ID of "1007" (i.e., the scheduled task information, a name of which is "get on a train" as shown in FIG. 2), in the case of the identification ID being "Log (entering a ticket gate)", the event accuracy is "1". That is, when the event of entering a ticket gate as described above occurs, it is predicted that there is a high possibility of a user performing an action of "getting on a train". The aforementioned schedule predicting section 111 predicts the scheduled activity as the predicted activity together with the event accuracy on the basis of an identification ID of the history information by the history obtaining section 110.

Continuously, the detail information storing section 108A will be explained referring to FIG. 6. FIG. 6 is a structure drawing explaining a structure of a table included in a database constituting the detail information storing section 108A. The detail information storing section 108A stores the scheduled task ID, URI information, and a service name being associated with each other. URI (Uniform Resource Identifier) information refers to information indicating a location on a network of the detail information on the basis of the selection information received by the selection receiving section 107. A service name refers to a name for the contents indicating the detail information. The explanation of the scheduled task ID described above will be omitted here.

As to, for example, the scheduled task ID of "1007" (i.e., the scheduled task information, a name of which is "to get on a train" as shown in FIG. 2), the detail information (URI information: http://*******.co.jp/sample3.html), including a service name of which is "railway operation condition of the entire JR line" is associated therewith. The aforementioned detail transmitting section 108 selects from the detail information storing section 108A, the URI information (or information given by a provider of the information, a location of which the URI information indicates) of the detail information on the basis of the selection information received by the selection receiving selection 107 to transmit the detail information via the communication network NW.

Continuously, the communication terminal 2 will be explained. The communication terminal 2 is a cell-phone unit or the like capable of communicating with the information providing system 1 as described above. The communication terminal 2 is provided with a communication section 201 (communication means), a display 202 (display means), an instruction input section 203 (instruction input means), a history storing section 204 (history storing means), and its own location obtaining section 205 (its own location obtaining means).

Subsequently, each component of the communication terminal 2 will be described. The communication section 201 is a section receiving/transmitting information from/to the information providing system 1. The communication section 201 transmits, for example, the schedule information, the selection information or the phase information to the information providing system 1, or receives the candidate information or detail information therefrom.

The display 202 is a section displaying information received/transmitted by/from the communication section 201, information obtained by the history storing section 204 or its own location obtaining section 205 described later. In the case that the scheduled information is input on the currently displayed screen urging to input the scheduled information, the display 202 switches it into the screen displaying the inhibition information and candidate information (i.e., a screen urging to input the selection information). Further, in the case that the selection information is selected on the currently displayed screen urging to select the selection information, the display 202 switches it into the screen displaying the detail information (i.e., a screen urging to input the selection information). The appearance of information indicated by the display 202 will be described later.

The instruction input section 203 is a section accepting an instruction input with respect to the information indicated by the display 202. The instruction input section 203 such as push-buttons and direction indicator keys is provided for the communication terminal 2. By pushing push-buttons or direction indicator keys provided for the communication terminal 2, or urging to input characters on the display 202, an input by instruction can be made.

The history storing section 204 is a section storing the aforementioned history information obtained by the communication terminal 2 therein. The history storing section 204 is constituted with, for example, a memory, etc.

Its own location obtaining section 205 is a section obtaining the location information of the communication terminal 2. Its own location obtaining section 205 is constituted with, for example, the GPS as described above or the like. Obtaining of the location information by its own location obtaining section 205 may be made periodically at regular intervals, or that may be made when the contents of the location information changes to a large degree, or that may be made at a given timing.

Figure 7:
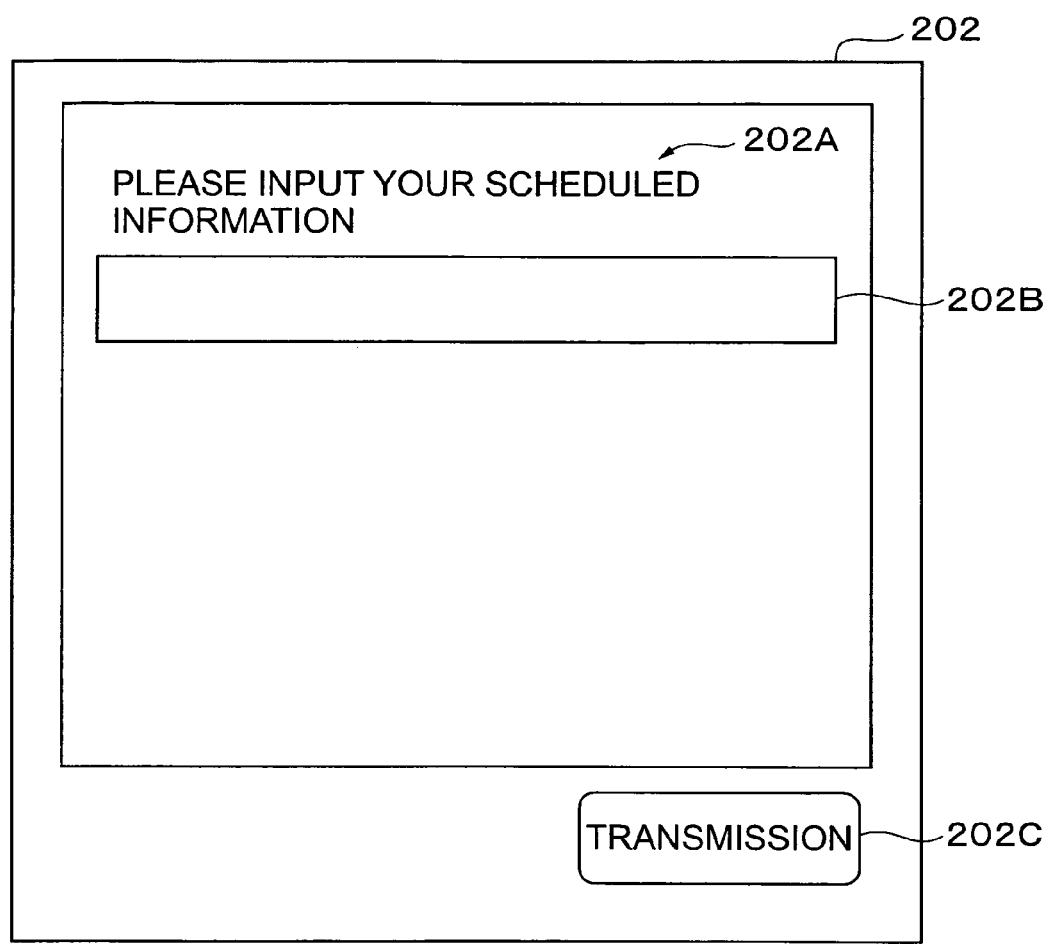
FIG. 7 is a layout chart depicting one example of the screen urging to input scheduled information

Continuously, the screen urging to input the scheduled information indicated by the display 202 will be described, referring to FIG. 7. FIG. 7 is a layout chart depicting one example of the screen urging to input the scheduled information. On the display 202, an instruction sentence 202A to the effect that "Please input your scheduled information", an input form 202B in which the scheduled information may be input, and a transmission button 202C for starting transmission of the input scheduled information to the information providing system 1 are displayed. The user of the communication terminal 2 inputs into the input form 202B his/her scheduled information (such as "moving to a theme park by my car"), using an instruction input section 203 to select the transmission button 202C, and thereby the scheduled information may be transmitted.

Figure 8:
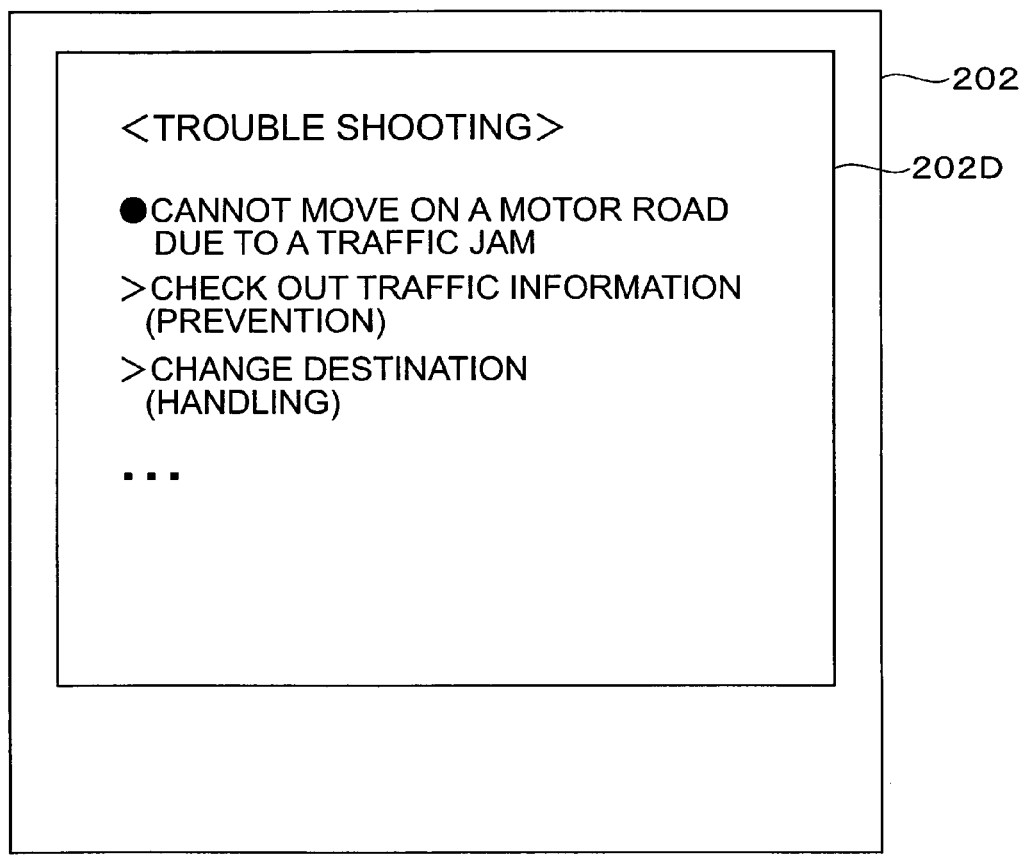
FIG. 8 is a layout chart depicting one example of the screen urging to input selection information
Figure 9:
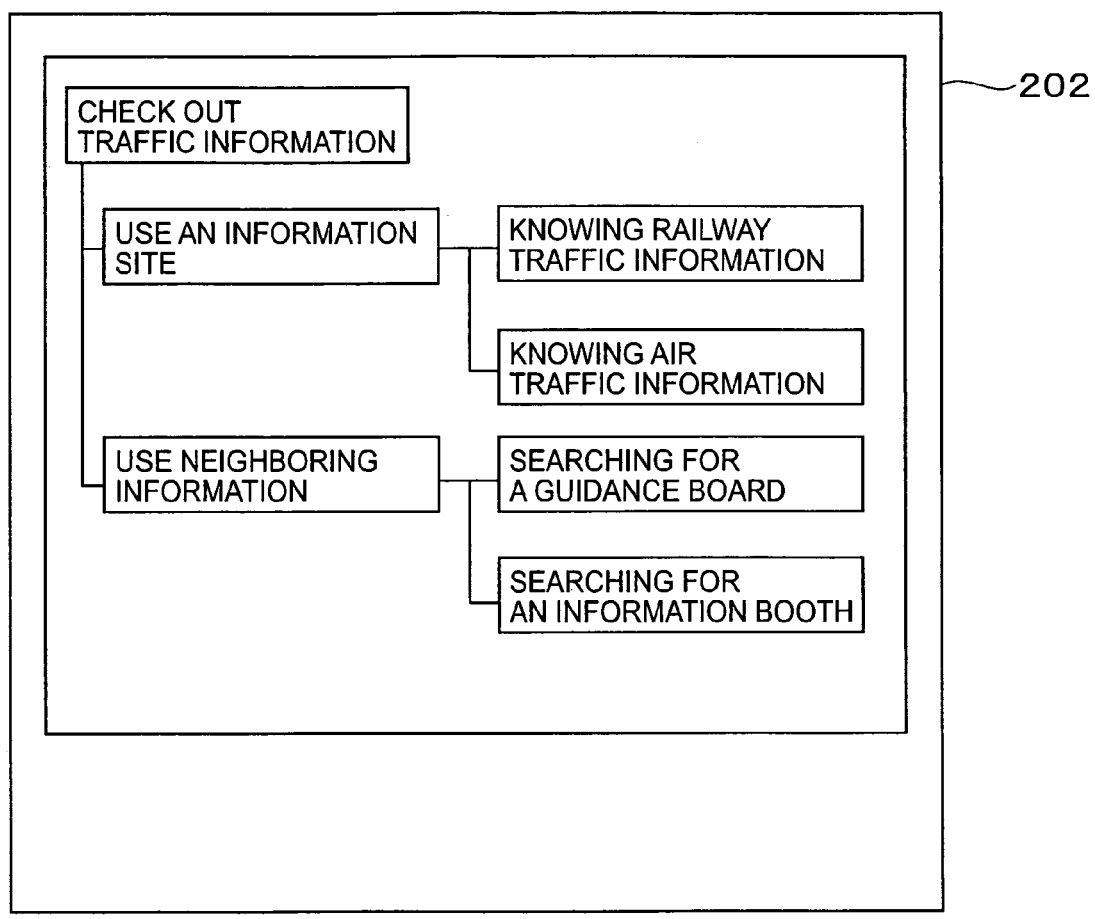
FIG. 9 is a layout chart depicting one example of a screen to be displayed next to the screen shown in FIG. 8.

Continuously, the screen urging to select the selection information indicated by the display 202 will be described, referring to FIGS. 8 and 9. FIG. 8 is a layout chart depicting one example of the screen urging to select the selection information. FIG. 9 is a layout chart depicting one example of the screen to be displayed next to the screen shown in FIG. 8. As depicted in FIG. 8, on the display 202, the inhibition information ("cannot move on a motor road due to a traffic jam") corresponding to the input scheduled information (i.e., "moving to a theme park by my car"), and the candidate information ("check out traffic information", or "change destination") corresponding to the inhibition information are displayed. The user of the communication terminal 2 selects the information indicating an action to take as a coping method as the selection information (e.g., "check out traffic information") among the candidate information, using the instruction input section 203, and thereby the selection information is transmitted to the information providing system 1.

Next, as depicted in FIG. 9, the selected selection information (i.e., "check out traffic information") and its corresponding candidate information ("to know railway traffic information", or "to know air traffic information") are indicated on the display 202, The user of the communication terminal 2 selects the information indicating an action to take as a coping method as the selection information (e.g., "to know railway traffic information") among the candidate information, using the instruction input section 203. Thereby the selection information is transmitted to the information providing system 1.

Figure 10:
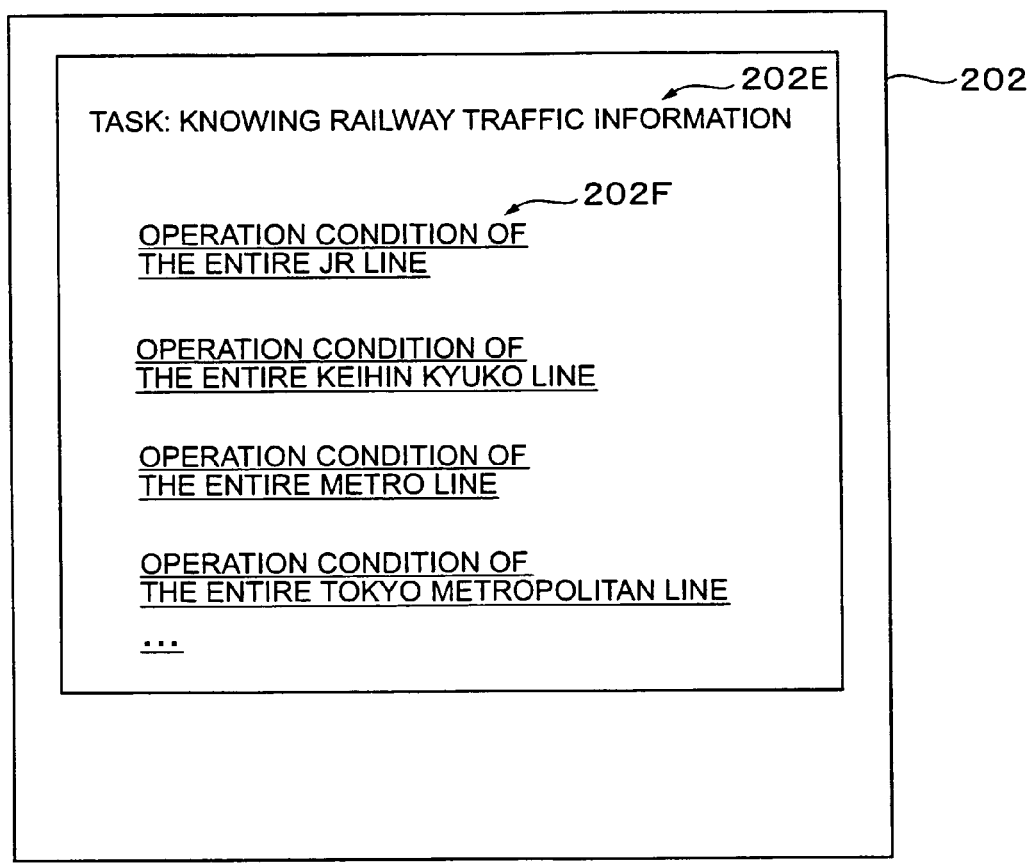
FIG. 10 is a layout chart depicting one example of a screen showing detail information

Continuously, the screen displaying the detail information indicated by the display 202 will be explained, referring to FIG. 10. FIG. 10 is a layout chart depicting one example of the screen displaying the detail information. On the display 202, the selection sentence 202E indicating the aforementioned selection information to the effect that "to know railway traffic information", and the anchor 202F in the underlined characters on the displayed 202 are displayed. The user of the communication terminal 2 selects the anchor 202F indicating a name of the desired information source, using the instruction input section 203 to obtain the detail information.

Figure 11:
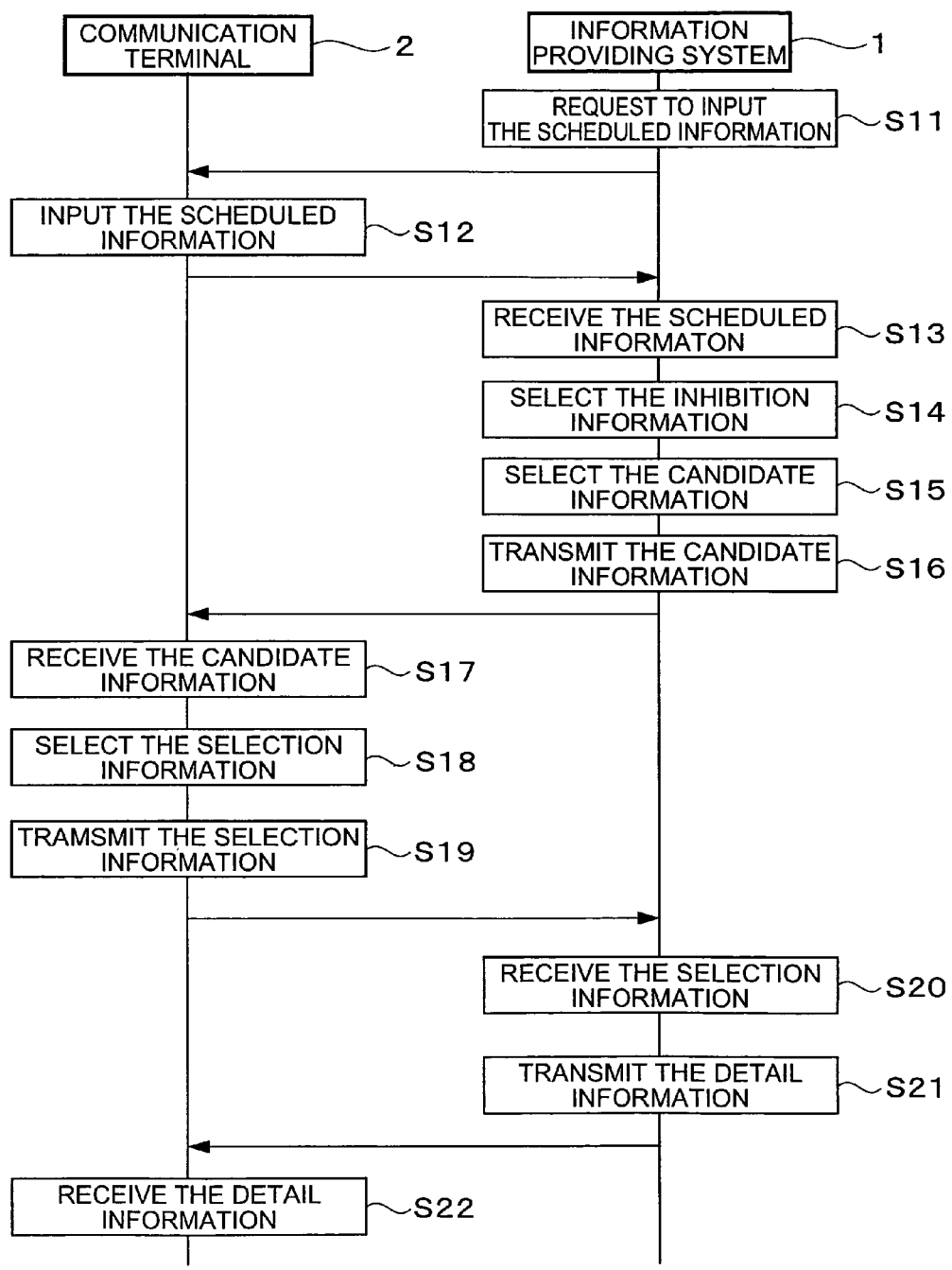
FIG. 11 is a sequence diagram depicting the operation in the information providing system.

Continuously, each operation of the information providing system 1 and the communication terminal 2 will be explained referring to the sequence diagram shown in FIG. 11. FIG. 11 is a sequence diagram depicting the operation in each information providing system 1 and communication terminal 2.

Firstly, the information providing system 1 requests the communication terminal 2 to input the scheduled information (S11), and thereby, the communication terminal 2 displays the screen urging to input the scheduled information as depicted in FIG. 7. Correspondingly, a user inputs the scheduled information into the communication terminal 2 (S12). The scheduled information that has been input is transmitted to the information providing system 1 from the communication terminal 2. The information providing system 1 receives the scheduled information from the communication terminal 2 (S13, the schedule receiving step).

Next, the information providing system 1 selects from the inhibition storing section 101, the inhibition information relating to the inhibition factor corresponding to the scheduled information received in step 13 (S14, the inhibition selection step). In the case that no inhibition information exists, an error occurrence is notified to the communication terminal 2 and the processing terminates. In addition, in the case that the aforementioned event accuracy is "1", information for coping with the previously occurred inhibition factor is selected. On the other hand, in case that the aforementioned event accuracy is "0", information for coping with the previously occurred inhibition factor, and information for preventing the inhibition factor that is anticipated to occur in the future are selected.

Next, the information providing system 1 selects from the candidate storing section 102, the candidate information relating to the candidates of a method of coping with the inhibition information selected in step 14 (S15, the candidate selection step). In the case that no candidate information exists, an error occurrence is notified to the communication terminal 2 and the processing terminates. Then, the information providing system 1 transmits the candidate information selected in step S15 to the communication terminal 2 (S16, the candidate transmission step), and at the same time, the communication terminal 2 receives the candidate information transmitted in step 16 (S17).

Here, the communication terminal 2 selects the selection information from the received candidate information as shown in FIG. 8 (S18), to transmit the selection information to the information providing system 1 (S19). At the same time, the information providing system 1 receives the selection information transmitted in step 19 (S20, the selection receiving step). The information providing system 1 transmits the detail information on the basis of the selection information received in step 20 to the communication terminal 2 (S21, the detail information transmission step). Then, the communication terminal 2 receives the detail information (S22), and thereby, the detail information is displayed in the communication terminal 2 as shown in FIG. 9. In addition, in the case that the aforementioned event accuracy is "0", the candidate information for preventing the inhibition factor that is anticipated to occur in the future is also indicated in the communication terminal 2.

Besides, the same procedures may be repeated by returning to the step 11 or step 18, etc. after the detail information is displayed on the communication terminal 2.

Continuously, the operational advantage of the present embodiment will be described. According to the information providing system 1, the inhibition information corresponding to the scheduled information and the candidate information corresponding to the inhibition information are selected, and the detail information based on the selection information which the communication terminal 2 has selected from among the candidate information is transmitted to the communication terminal 2. As a result, the information providing system 1 is capable of providing easily the detail information required for the user of communication terminal 2 to execute the scheduled information smoothly. Thereby, the user may adopt a coping method corresponding to the inhibition factor required to adapt to the situation.

The schedule receiving section 103 receives the phase information, and the inhibition selecting section 104 selects the inhibition information from the inhibition storing section 101 on the basis of the phase information. Consequently, the inhibition information is selected by the inhibition selecting section 104 depending on whether the scheduled information is at the planning phase or at the execution phase, thereby the information providing system 1 may provide the user of the communication terminal 2 with the more appropriate detail information according to the situation of the phase of the scheduled activity.

The information providing system 1 is further provided with the location obtaining section 109, and the inhibition selecting section 104 selects the inhibition information from the inhibition storing section 101 on the basis of the location information obtained by the location obtaining section 109. Consequently, the inhibition information is selected by the inhibition selecting section 104 on the basis of the location information of the communication terminal 2, thereby the information providing system 1 may provide the user of the communication terminal 2 with the more appropriate detail information according to the location of the communication terminal 2.

The information providing system 1 is further provided with the history obtaining section 110, and the inhibition selecting section 104 selects the inhibition information from the inhibition storing section 101 on the basis of the history information obtained by the history obtaining section 110. Consequently, the inhibition information is selected from the inhibition selecting section 104 on the basis of the history information with respect to the communication made at the communication terminal 2, and thereby the information providing system 1 may provide the user of the communication terminal 2 with the more appropriate detail information according to the history information of the communication terminal 2.

The information providing system 1 is further provided with the schedule predicting section 111, and the inhibition selecting section 104 selects the inhibition information from the inhibition storing section 101 on the basis of the predicted activity predicted by the schedule predicting section 111. Consequently, the inhibition information is selected by the inhibition selecting section 104 on the basis of the predicted activity predicted by the schedule predicting section 111. Thereby, the information providing system 1 may provide the user of the communication terminal 2 with the more appropriate and more potentially required detail information according to the predicted activity for the communication terminal 2.

The present invention has been concretely explained based on the embodiment, however, the present invention is not limited to the aforementioned embodiment and various modifications may be made. In addition, the aforementioned embodiment and the following modification do not limit a scope of the present invention, and a person skilled in the art may develop these embodiments and modifications without deviating from the subject of inventive patent claims.

Figure 12:
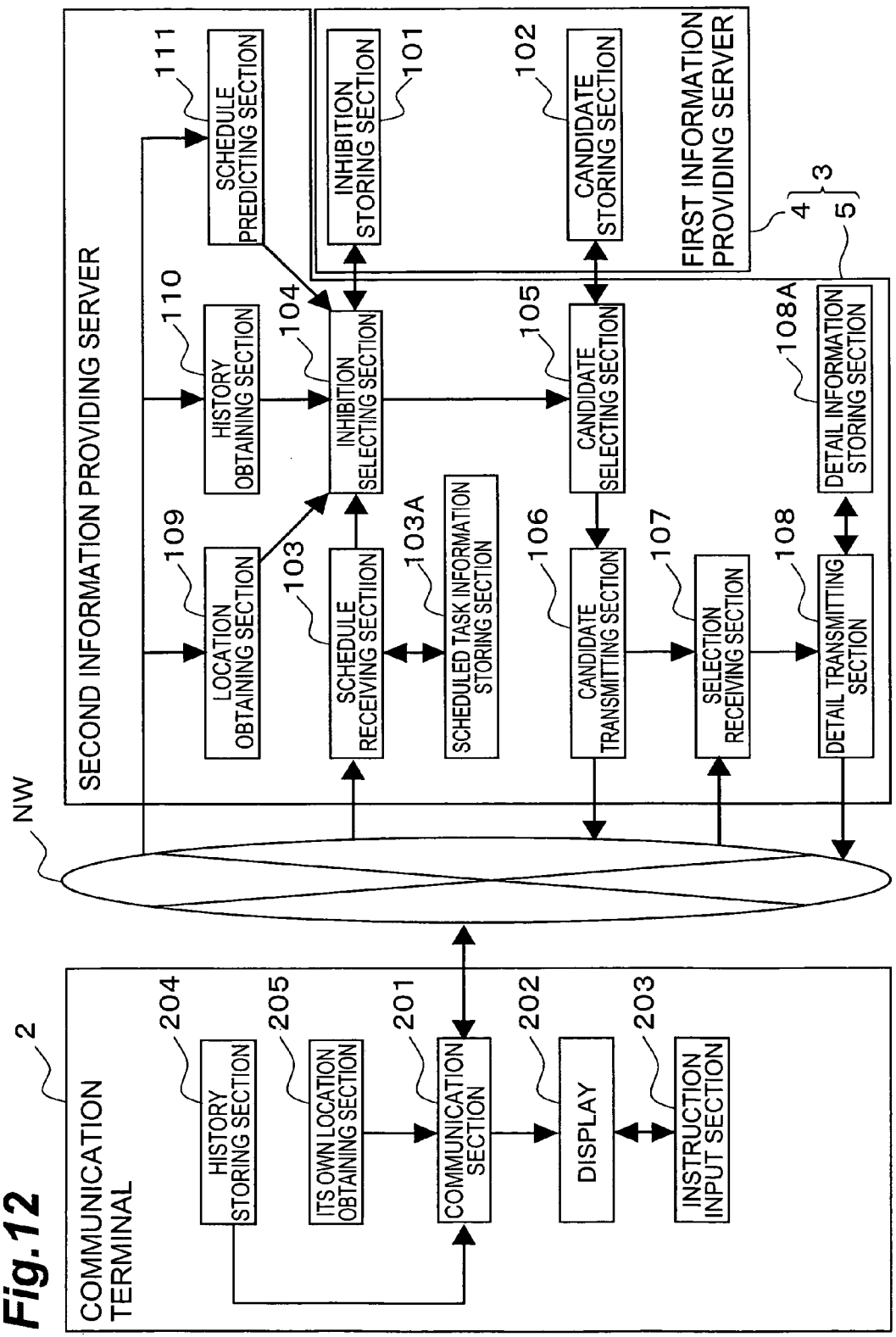
FIG. 12 is a configuration drawing of a modification of the information providing system.

For example, an information providing system 3, a modification of the information providing system 1 may be configured as a collective of a first information providing server 4 and a second information providing server 5 as shown in FIG. 12. The first information providing server is provided with an inhibition storing section 101 and a candidate storing section 102, and the second information providing server may be provided with all components other than the inhibition storing section 101 and the candidate storing section 102. Namely, the second information providing server is provided with a schedule receiving section 103, a scheduled task information storing section 103A, an inhibition selecting section 104, a candidate selecting section 105, a candidate transmitting section 106, a selection receiving section 107, a detail transmitting section 108, a detail information storing section 108A, a location obtaining section 109, a history obtaining section 110, and a schedule predicting section 111.

What is claimed is:

1. An information providing system for searching information required for a user of a mobile communication terminal to execute a scheduled activity planned by the user to provide it to the user, comprising:
    an inhibition storing means for preliminarily storing inhibition information relating to at least one inhibition factor corresponding to scheduled information relating to the scheduled activity, the inhibition factor being a factor which inhibits execution of the scheduled activity due to an impediment along a travel route to the scheduled activity;
    a candidate storing means for preliminarily storing candidate information relating to at least one candidate of a coping method corresponding to the inhibition information stored in the inhibition storing means, the candidate of a coping method being a method of coping with the inhibition factor;
    a schedule receiving means for receiving the scheduled information and phase information indicating whether the scheduled activity is at a planning phase or at an execution phase from the mobile communication terminal of the user, the mobile communication terminal being separate from the information providing system and configured to connect to the information providing system via a network;

an inhibition selecting means for selecting, from the inhibition storing means, the inhibition information corresponding to the schedule information received by the schedule receiving means, wherein the inhibition information is generated independently of the schedule information and the inhibition selecting means selects the inhibition information from the inhibition storing means on at least a basis of a determination that the inhibition information corresponds to the schedule information and the phase information received by the schedule receiving means;

a candidate selecting means for selecting, from the candidate storing means, the candidate information corresponding to the inhibition information selected by the inhibition selecting means;

a candidate transmitting means for transmitting the candidate information selected by the candidate selecting means to the communication terminal;

a selection receiving means for receiving, from the mobile communication terminal, selection information selected from among the candidate information by the mobile communication terminal which received the candidate information from the candidate transmitting means;

a detail transmitting means for transmitting, to the mobile communication terminal, detail information based on the selection information received by the selection receiving means; and a location obtaining means for obtaining location information of the mobile communication terminal, wherein the inhibition selecting means further automatically selects the inhibition information from the inhibition storing means on the basis of the location information obtained by the location obtaining means.

2. The information providing system according to claim 1 further comprising, a history obtaining means for obtaining history information relating to a communication of the mobile communication terminal, wherein the inhibition selecting means further selects the inhibition information from the inhibition storing means on the basis of the history information obtained by the history obtaining means.

3. The information providing system according to claim 2, further comprising, a schedule predicting means for predicting the scheduled activity as a predicted activity on the basis of the history information obtained by the history obtaining means, wherein the inhibition selecting means further selects the inhibition information from the inhibition storing means on the basis of the predicted activity predicted by the schedule predicting means.

4. An information providing method for an information providing system of searching information required for a user of a mobile communication terminal to execute a scheduled activity planned by the user to provide it to the user, comprising:

a schedule receiving step of receiving schedule information and phase information indicating whether the scheduled activity is at a planning phase or at an execution phase, at the information providing system, relating to the scheduled activity from the mobile communication terminal of the user, the mobile communication terminal being separate from the information providing system and configured to connect to the information providing system via a network;

an inhibition selecting step of selecting from an inhibition storing means preliminary storing inhibition information, the inhibition information relating to at least one inhibition factor corresponding to the schedule information received in the schedule receiving step, the inhibition factor being a factor which inhibits execution of the scheduled activity due to an impediment along a travel route to the scheduled activity, wherein the inhibition information is generated independently of the schedule information and the inhibition selecting step includes selecting the inhibition information from the inhibition storing means on at least a basis of a determination that the inhibition information corresponds to the schedule information and the phase information received in the schedule receiving step;

a candidate selecting step of selecting from a candidate storing means preliminary storing candidate information, the candidate information relating to at least one candidate of a coping method corresponding to the inhibition information selected in the inhibition selecting step, the candidate of a coping method being a method of coping with the inhibition factor;

a candidate transmitting step of transmitting the candidate information selected in the candidate selecting step to the mobile communication terminal;

a selection receiving step of receiving, from the mobile communication terminal, the selection information selected from among the candidate information by the mobile communication terminal which received the candidate information in the candidate transmitting step;

a detail transmitting step of transmitting detail information based on the selection information received in the selection receiving step to the mobile communication terminal; and a location obtaining step of obtaining location information of the mobile communication terminal, wherein the inhibition selecting step includes further automatically selecting the inhibition information from the inhibition storing means on the basis of the location information obtained in the location obtaining step.

5. An information providing system for searching information required for a user of a mobile communication terminal to execute a scheduled activity planned by the user to provide it to the user, comprising:

an inhibition storing unit configured to preliminarily store inhibition information relating to at least one inhibition factor corresponding to scheduled information relating to the scheduled activity, the inhibition factor being a factor which inhibits execution of the scheduled activity due to an impediment along a travel route to the scheduled activity;

a candidate storing unit configured to preliminarily store candidate information relating to at least one candidate of a coping method corresponding to the inhibition information stored in the inhibition storing unit, the candidate of a coping method being a method of coping with the inhibition factor;

a schedule receiving unit configured to receive the scheduled information and phase information indicating whether the scheduled activity is at a planning phase or at an execution phase from the mobile communication terminal of the user, the mobile communication terminal being separate from the information providing system and configured to connect to the information providing system via a network;

an inhibition selecting unit configured to select, from the inhibition storing unit, the inhibition information corresponding to the schedule information received by the schedule receiving unit, wherein the inhibition information is generated independently of the schedule information and the inhibition selecting unit selects the inhibition information from the inhibition storing unit on at least a basis of a determination that the inhibition information corresponds to the schedule information and the phase information received by the schedule receiving unit;

a candidate selecting unit configured to select, from the candidate storing unit, the candidate information corresponding to the inhibition information selected by the inhibition selecting unit;

a candidate transmitting unit configured to transmit the candidate information selected by the candidate selecting unit to the communication terminal;

a selection receiving unit configured to receive, from the mobile communication terminal, selection information selected from among the candidate information by the mobile communication terminal which received the candidate information from the candidate transmitting unit;

a detail transmitting unit configured to transmit, to the mobile communication terminal, detail information based on the selection information received by the selection receiving unit; and a location obtaining unit configured to obtain location information of the mobile communication terminal, wherein the inhibition selecting unit further automatically selects the inhibition information from the inhibition storing unit on the basis of the location information obtained by the location obtaining unit.

6. The information providing system according to claim 1, further comprising:

a history obtaining means for obtaining history information relating to a communication of the mobile communication terminal; and a schedule predicting means for predicting the scheduled activity as a predicted activity on the basis of the history information obtained by the history obtaining means, and the inhibition selecting means further selects the inhibition information from the inhibition storing means on the basis of the history information obtained by the history obtaining means, and the predicted activity predicted by the schedule predicting means.

* * * * *